(12) United States Patent
Lin

(10) Patent No.: US 6,898,073 B2
(45) Date of Patent: May 24, 2005

(54) HAND-HELD ELECTRONIC DEVICE (75) Inventor: Yun-Tzer Lin, Taipei (TW)

(73) Assignee: Mitach International, Hsinchu (TW)

( * ) Notice: Subject to any disclaimer, the term of this patent is extended or adjusted under 35 U.S.C. 154(b) by 100 days.

(21) Appl. No.: 10/331,994

(22) Filed: Dec. 31, 2002

(65) Prior Publication Data
US 2004/0125548 A1 Jul. 1, 2004

(51) Int. Cl.$^7$ ................................................. G06F 1/16
(52) U.S. Cl. .................. 361/679; 361/680; 361/683; 379/433.12; 455/575.4
(58) Field of Search ...................... 361/680, 681, 361/679, 683, 686; 345/168, 101, 169, 905; 400/471, 472, 489, 393; 455/555, 556; 379/433.07; 312/223.1, 223.2, 265.6; 248/535, 536, 917, 918

(56) References Cited

U.S. PATENT DOCUMENTS

| | | | |
|---|---|---|---|
| 5,644,338 A | * | 7/1997 | Bowen .......................... 345/168 |
| 5,907,615 A | * | 5/1999 | Kaschke ................... 379/433.12 |
| 6,144,551 A | * | 11/2000 | Kao ............................. 361/681 |
| 6,643,124 B1 | * | 11/2003 | Wilk ............................ 361/681 |
| 6,704,417 B2 | * | 3/2004 | Kim ........................ 379/433.07 |
| 6,748,249 B1 | * | 6/2004 | Eromaki et al. ........... 455/575.4 |
| 2003/0048205 A1 | * | 3/2003 | He ................................. 341/26 |
| 2003/0100338 A1 | * | 5/2003 | Lee .............................. 455/556 |
| 2004/0005184 A1 | * | 1/2004 | Kim et al. ................... 400/472 |
| 2004/0052044 A1 | * | 3/2004 | Mochizuki et al. .......... 361/683 |

* cited by examiner

Primary Examiner—Michael Datskovskiy
(74) Attorney, Agent, or Firm—Birch, Stewart, Kolasch & Birch, LLP (57) ABSTRACT A hand-held electronic device includes a main body, a first lid and a second lid. The main boy has ends engaging pivotally with the first lid and the second lid, which also has a keyboard located thereon. The first lid and the second lid are turnable selectively to cover a usage surface that contains button keys and a screen to protect the usage surface from being damaged by impact. Only the screen is exposed to the usage surface of the main body to prevent accidental key punching while operating the main body. The second lid provides keyboard data entry to make data entry more convenient.

16 Claims, 11 Drawing Sheets

HAND-HELD ELECTRONIC DEVICE

FIELD OF THE INVENTION

The invention relates to a hand-held electronic device adopted for use on electronic devices such as Personal Digital Assistants (PDAs), and particularly a hand-held electronic device that has a lid for selectively protecting the usage surface of the device and preventing accidental key punching during operation.

BACKGROUND OF THE INVENTION

A wide variety of hand-held electronic devices have been developed and introduced in recent years to meet consumers' need to access and process information any time anywhere. These hand-held electronic devices generally have only a main body. When the electronic device is dropped or hit inadvertently, the damage incurred to the surface might not impact the functionality. However when the screen of the hand-held electronic device is damaged, it usually is unusable and has to be repaired. Now some PDAs have an additional lid to prevent the situation mentioned above from happening. However, it still cannot prevent users from mistakenly depressing the button keys during operation. Hence in terms of convenience, there is still room for improvement.

Moreover, when inputting data into the main body, if users are not accustomed to hand-written input or the function of the handwriting recognition software is not good enough, users have to attach an external keyboard to do data entry. This is also inconvenient.

Because of the aforesaid disadvantages, it is important to develop an improved hand-held electronic device to better meet users' requirements.

SUMMARY OF THE INVENTION

The primary object of the invention is to provide a hand-held electronic device that can selectively protect the usage surface of the device to prevent the surface from being damaged by impact and also prevent accidental key punching during operation.

The hand-held electronic device of the invention includes a main body, a first lid and a second lid. The main body has ends to pivotally engage with the first lid and the second lid, which is also equipped with a keyboard. The first lid and the second lid may be turned selectively to cover the usage surface with button keys and the screen to protect the usage surface from being hit and damaged, and to allow only the screen on the surface be exposed to avoid accidental key punching while operating. The second lid may provide data entry on the keyboard to improve input convenience and to eliminate the inconvenience of attaching an external keyboard so that users can enter data freely. When the first lid and the second lid are coupled with the upper end and the lower end of the main body, the first lid may serve as a support rack for the main body to enable the main body to be rested with an inclined angle to facilitate user viewing.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
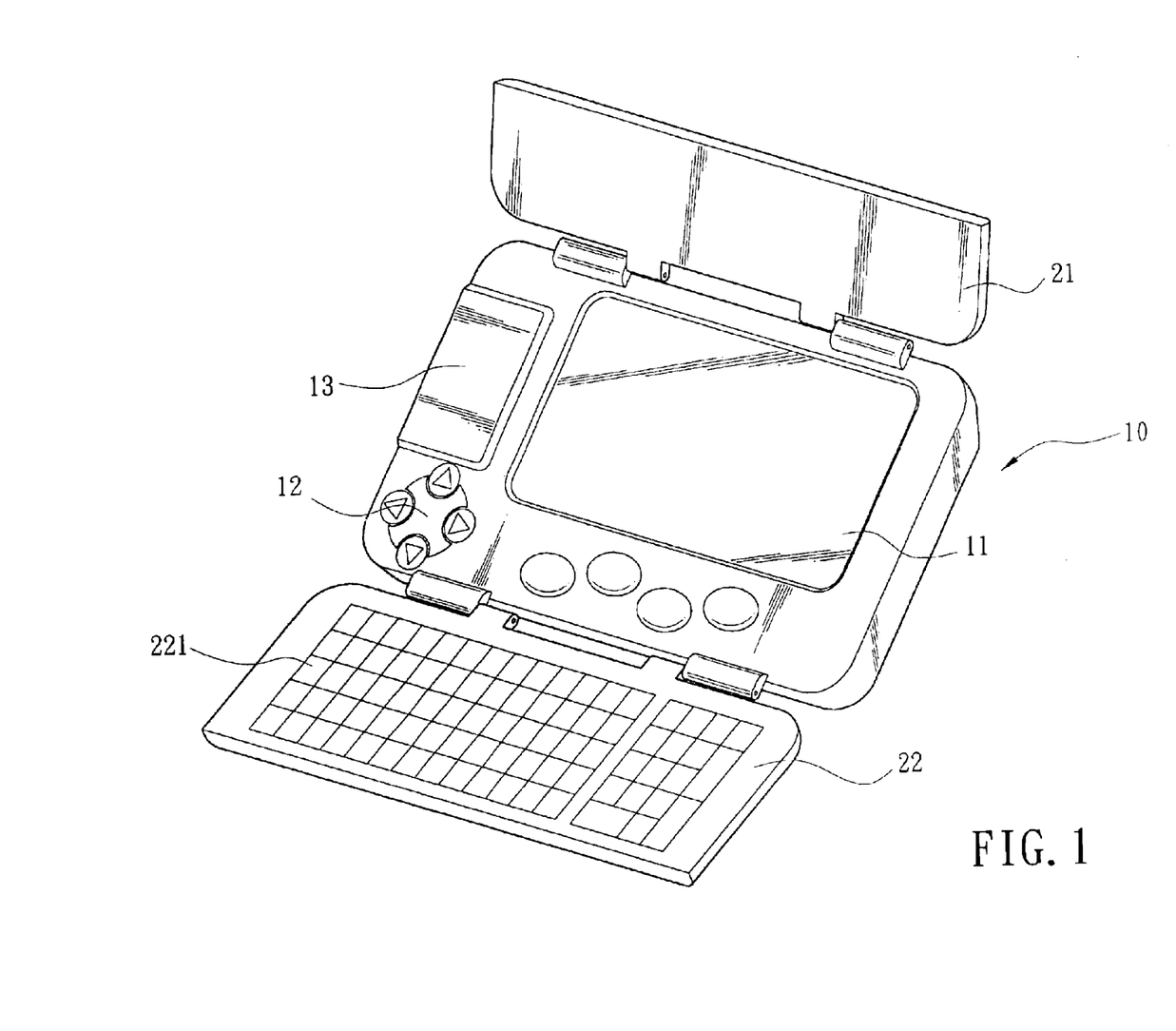
FIG. 1 is a perspective view of a first embodiment of the invention in an extended condition.
Figure 2:
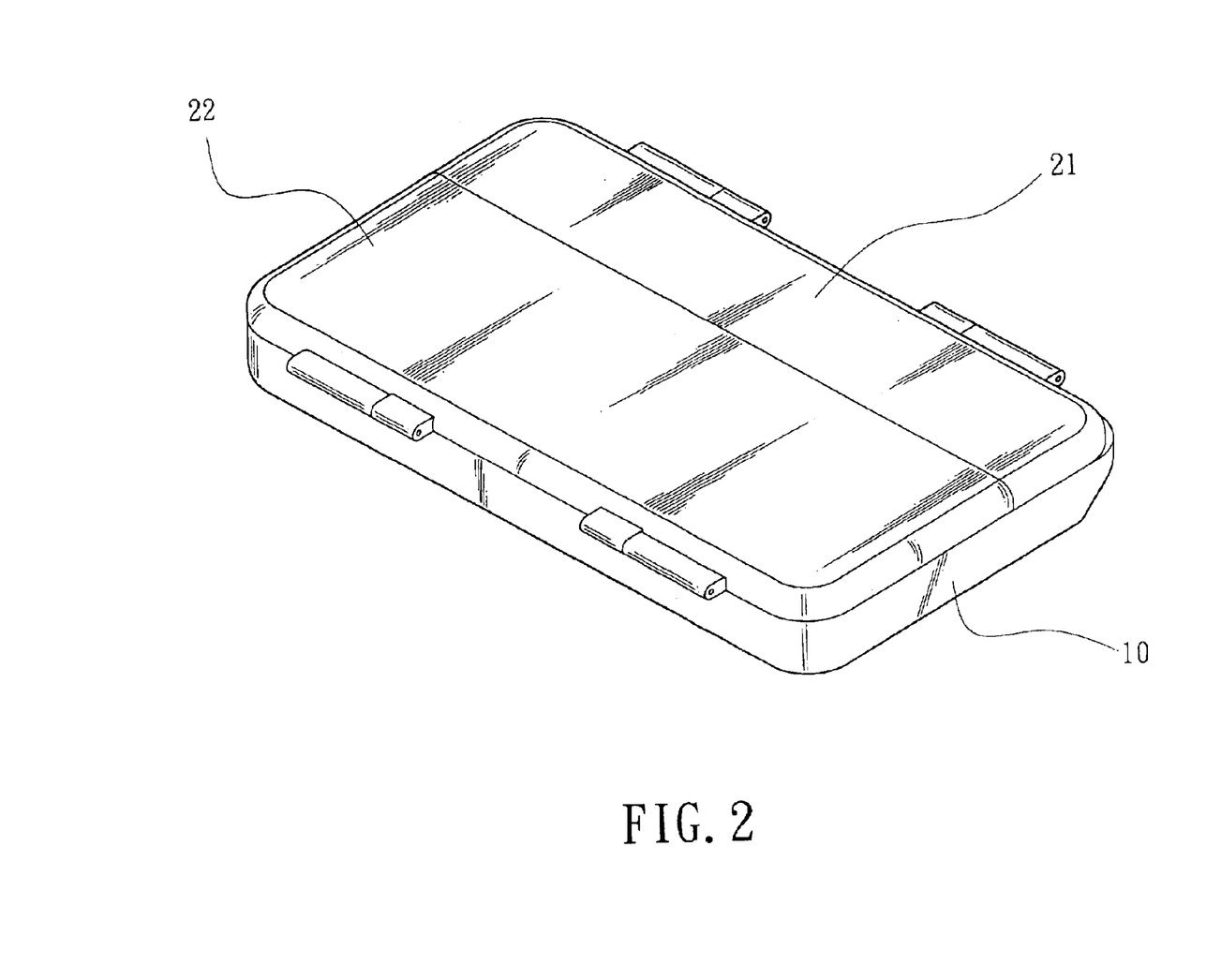
FIG. 2 is a perspective view of the first embodiment of the invention in a folded condition.
Figure 3:
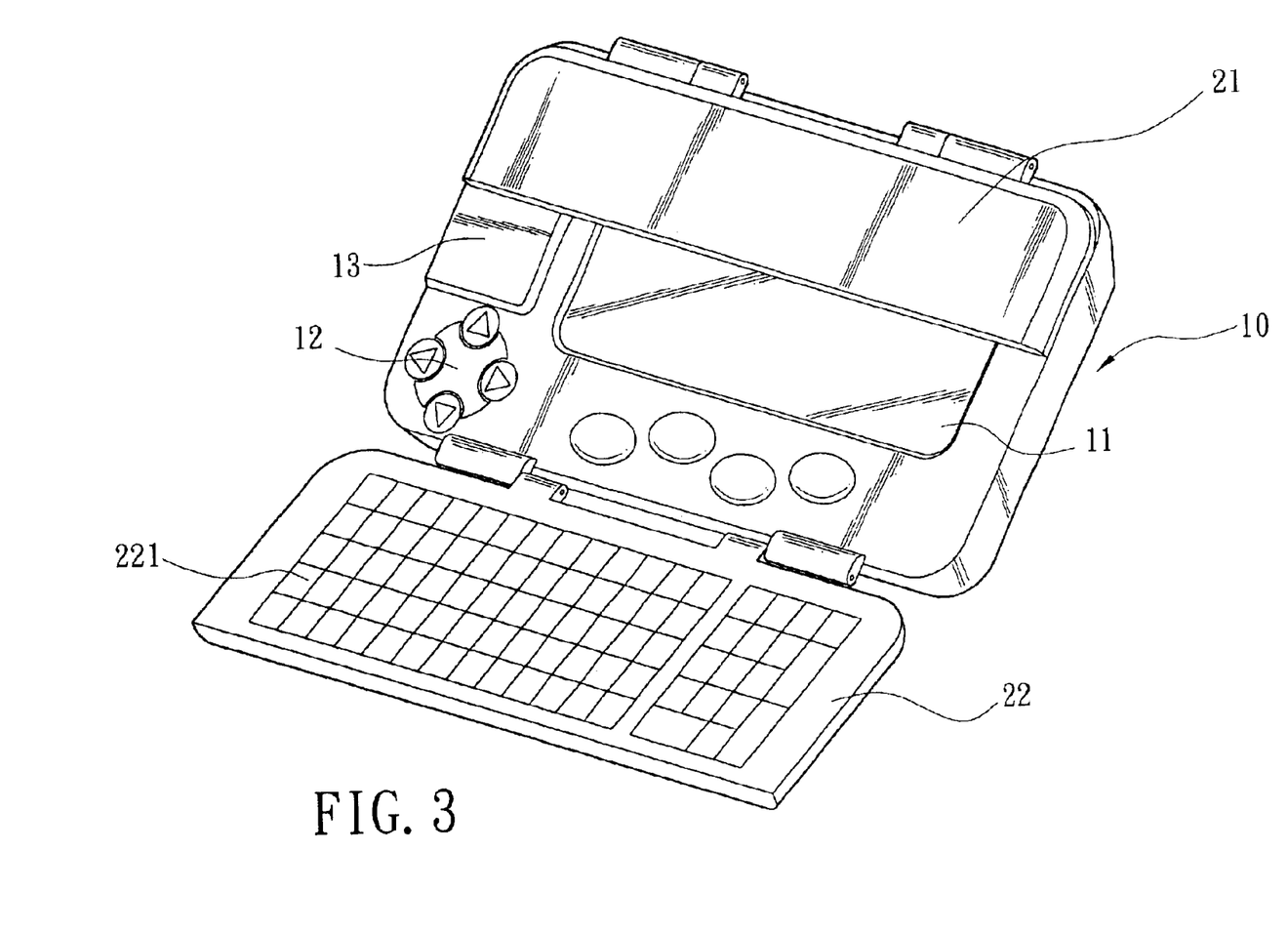
FIG. 3 is a perspective view of the first embodiment of the invention with the first lid in a folded condition.

Referring to FIG. 1, the hand-held electronic device according to the invention consists of a main body 10, a first lid 21 and a second lid 22. The main body 10 is for processing data and is formed in a rectangular shape. It has a usage surface for holding a screen 11, button keys 12 (such as direction keys and the like) and a grip section 13. The screen 11 displays data processed by the main body 10. It is laid in such a fashion that the displaying data are in parallel with the long axis of the main body 10. The button keys 12 are located on other positions of the main body 10 where the screen 11 is located, to enable users to enter input on the main body 10 and correspond to the first lid 21 that is in contact with the main body 10. The grip section 13 is located on one end of the main body 10 and is extended from the main body 10 to allow users to hold the device securely when in use (the grip section 13 may attach to a soft pad or a pliable material to make users more comfortable while gripping). In this embodiment, the grip section is located on the left side for right-handed users to grip the device with the left hand when in use. Of course the grip section may also be located on the right side for left-handed users to grip the device with the right hand when in use. The grip section 13 may also be dispensed with and the space may be saved to install other function keys 12. In addition, the two opposite ends of the main body 10 are pivotally engaged with the first lid 21 and the second lid 22. The first lid 21 may function as a shield to block out external light to prevent users from uncomfortable viewing. The first lid 21 may also be equipped with communication facilities such as a wireless communication module or an antenna. As shown in FIGS. 2 and 3, the first lid 21 and the second lid 22 may be turned to selectively cover the screen 11, button keys 12 and grip section 13 (i.e. the usage surface) of the main body 10 to protect the usage surface from being damaged by impact, and to cover a portion of the button keys 12 to avoid accidental key punching when operating the main body 10.

Figure 4:
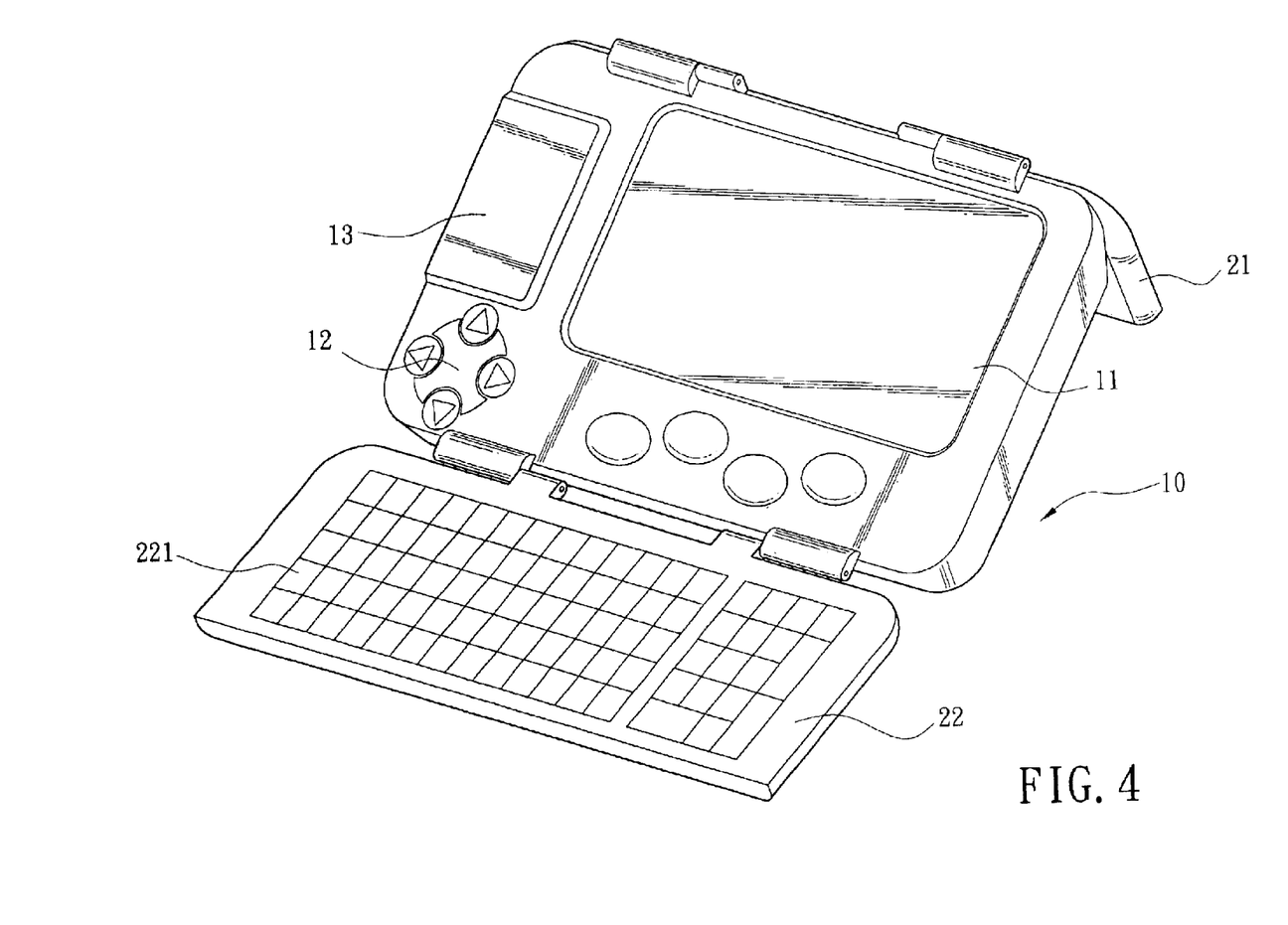
FIG. 4 is a perspective view of the first embodiment of the invention in a usage condition.

Referring to FIG. 4, the first lid 21 may further be turned backwards from the position of being in contact with the main body 10 to the rear side of the main body 10 so that when the main body 10 is placed on a flat surface for use the first lid 21 may serve as a support rack to raise the main body 10 to an inclined angle for users to see the screen 11 on the main body 10 more comfortably.

The surface of the second lid 22 in contact with the main body 10 has a keyboard 221 located thereon to enable users to input data without connecting an external keyboard. This saves users a lot of trouble involved with connecting the external keyboard and makes data entry more convenient for users. The keyboard 221 may be a membrane keyboard or a conventional keyboard.

While the embodiment set forth above has the first lid 21 and the second lid 22 pivotally engaged with the upper end and the lower end of the main body 10 to conform to users' accustomed habit for data entry, the first lid 21 and the second lid 22 may also be pivotally engaged with the left end and the right end of the main body 10, and with the grip section 13 located on the left upper end or the right upper end to facilitate user gripping.

Figure 5:
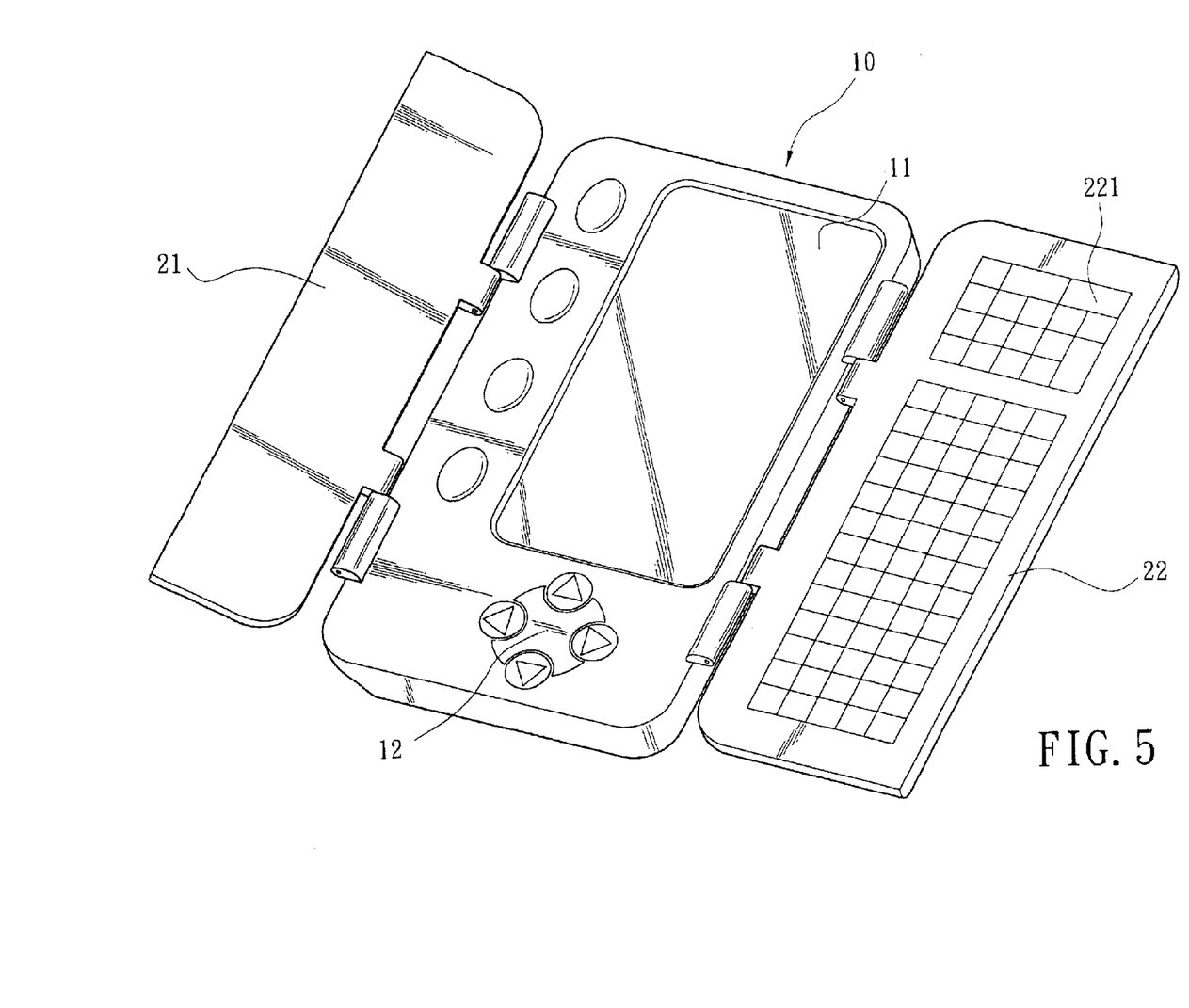
FIG. 5 is a perspective view of a second embodiment of the invention in an extended condition.
Figure 6:
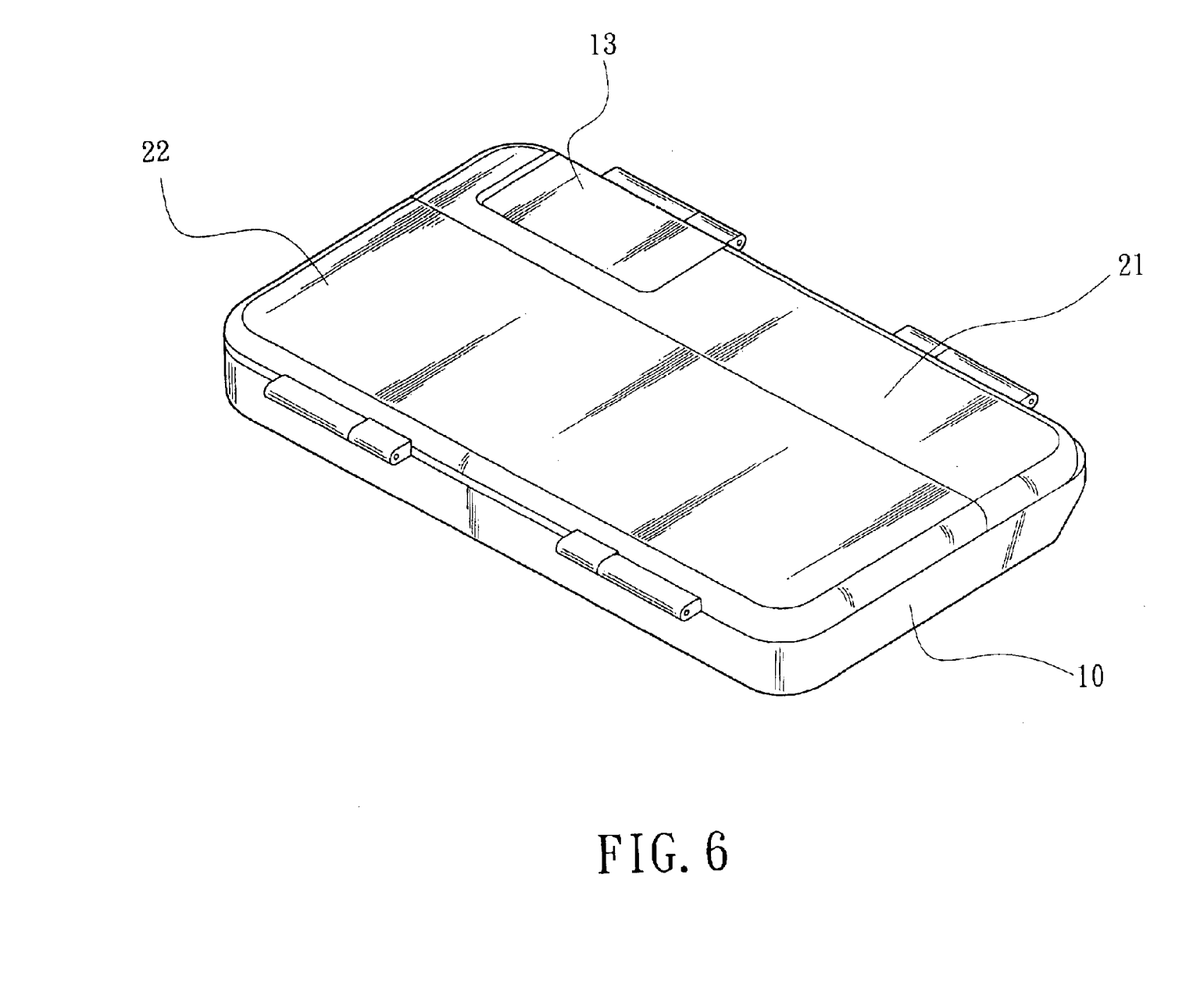
FIG. 6 is a perspective view of the second embodiment of the invention in a folded condition.
Figure 7:
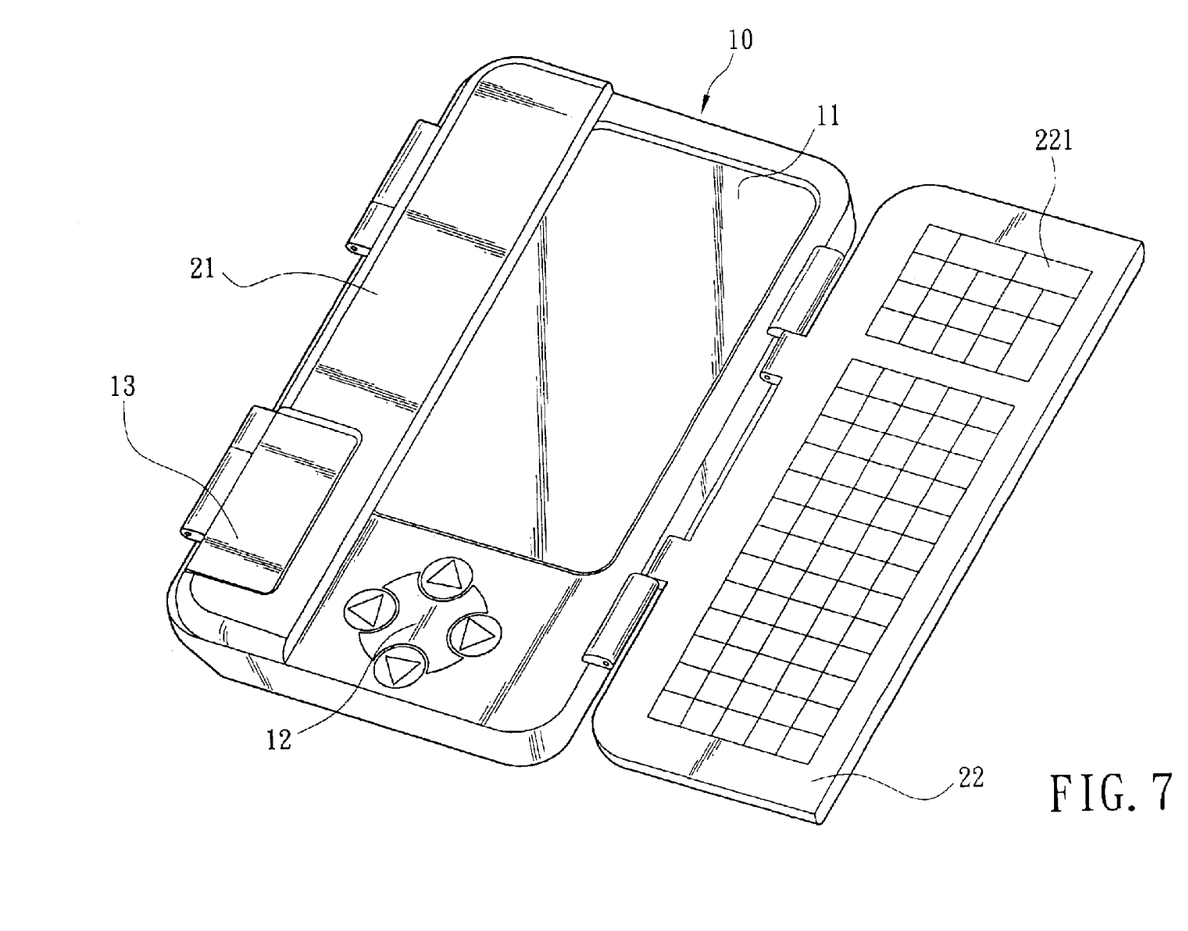
FIG. 7 is a perspective view of the second embodiment of the invention with the first lid in a folded condition.
Figure 8:
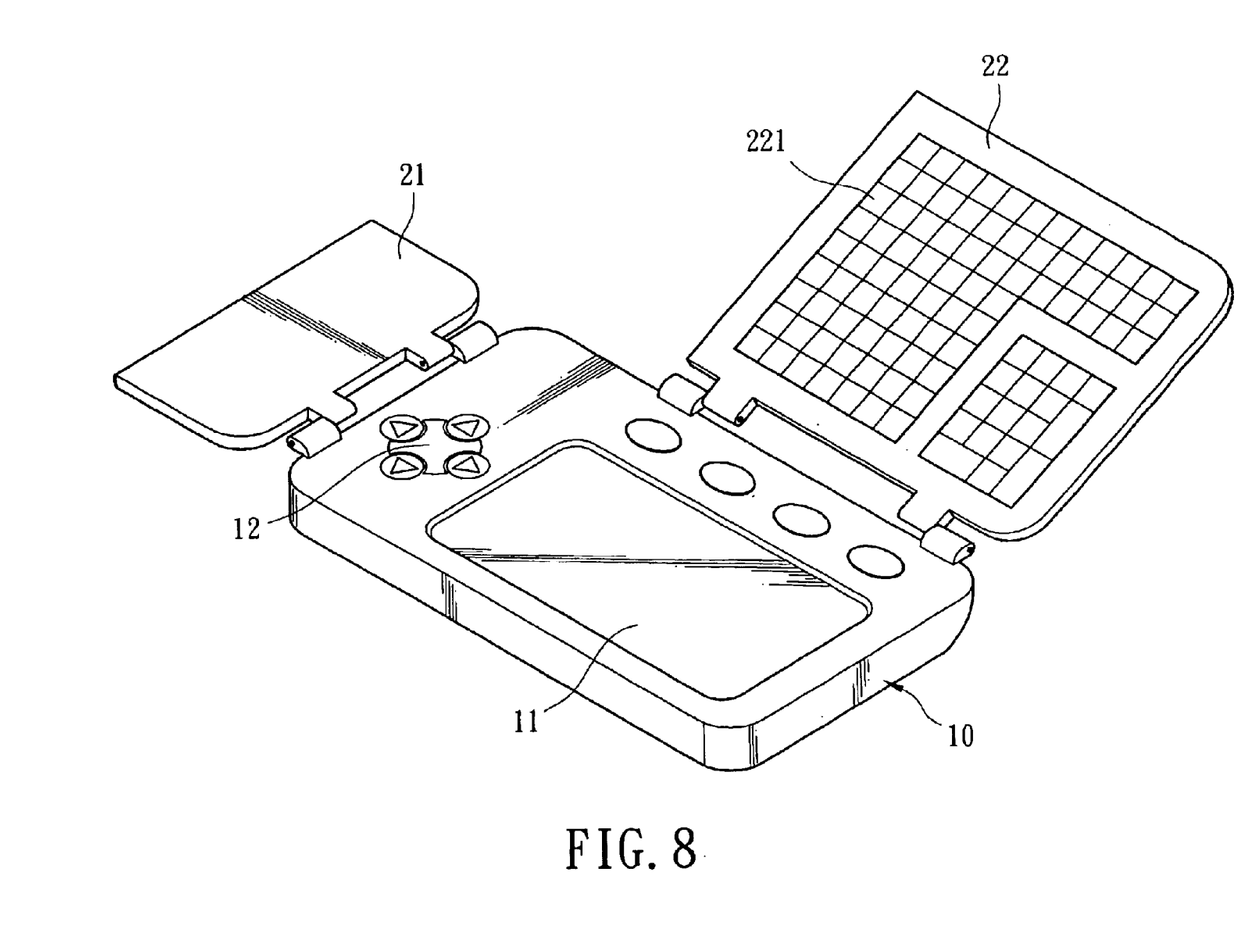
FIG. 8 is a perspective view of a third embodiment of the invention in an extended condition.
Figure 9:
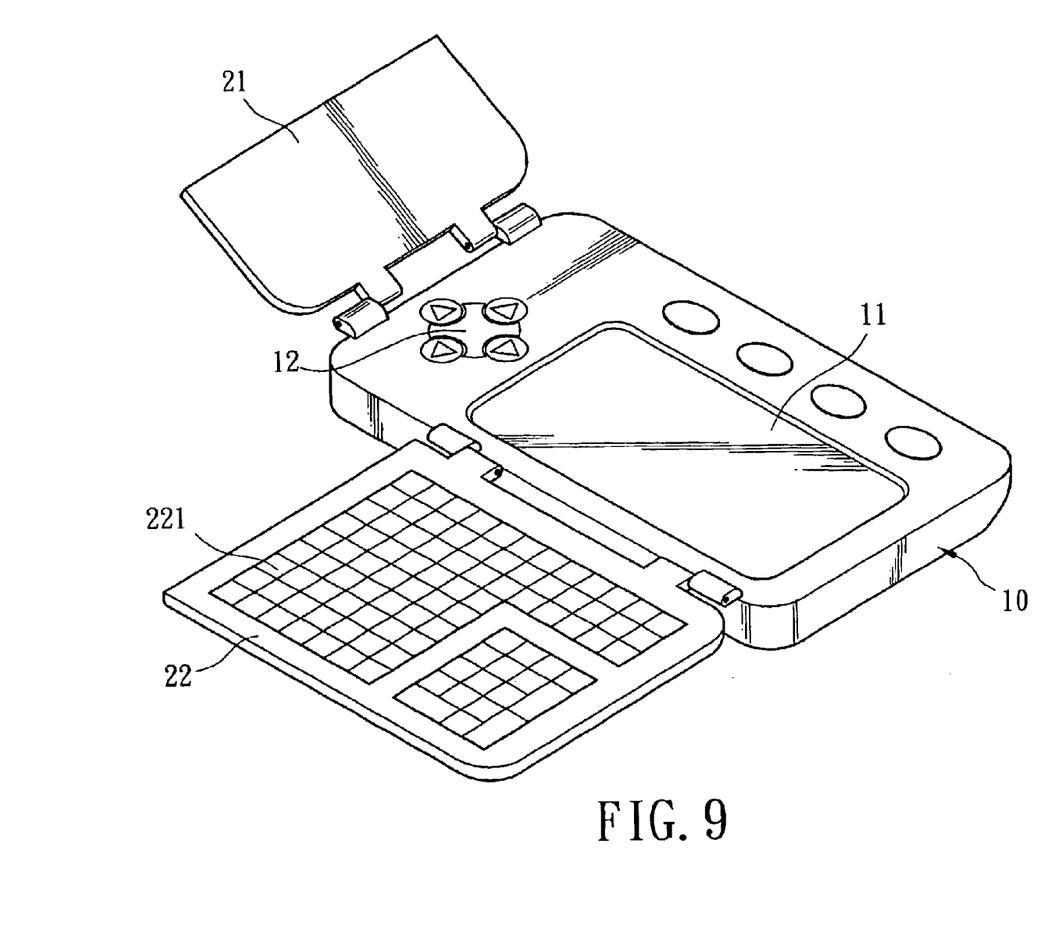
FIG. 9 is a perspective view of a fourth embodiment of the invention in an extended condition.
Figure 10:
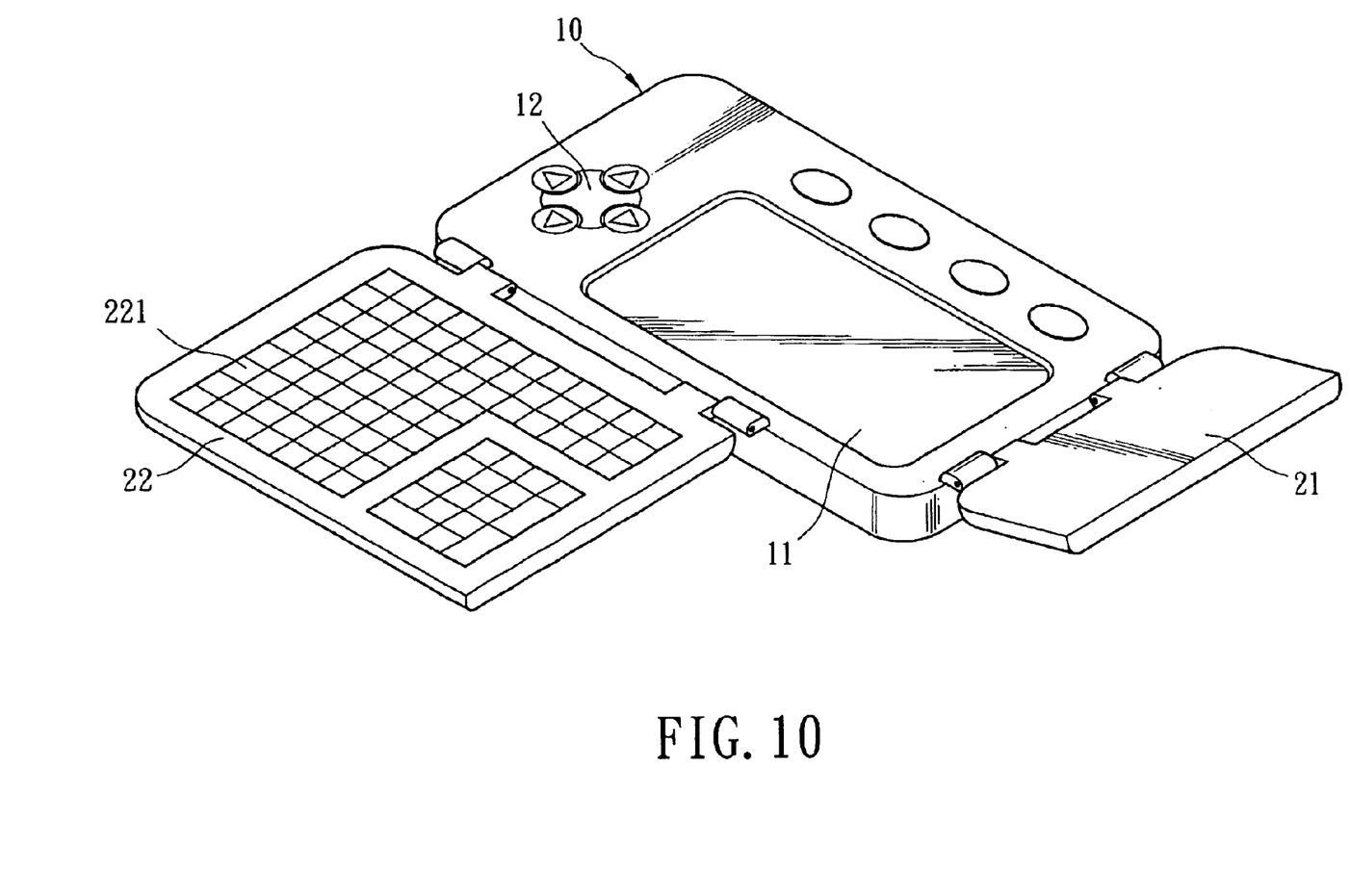
FIG. 10 is a perspective view of a fifth embodiment of the invention in an extended condition.
Figure 11:
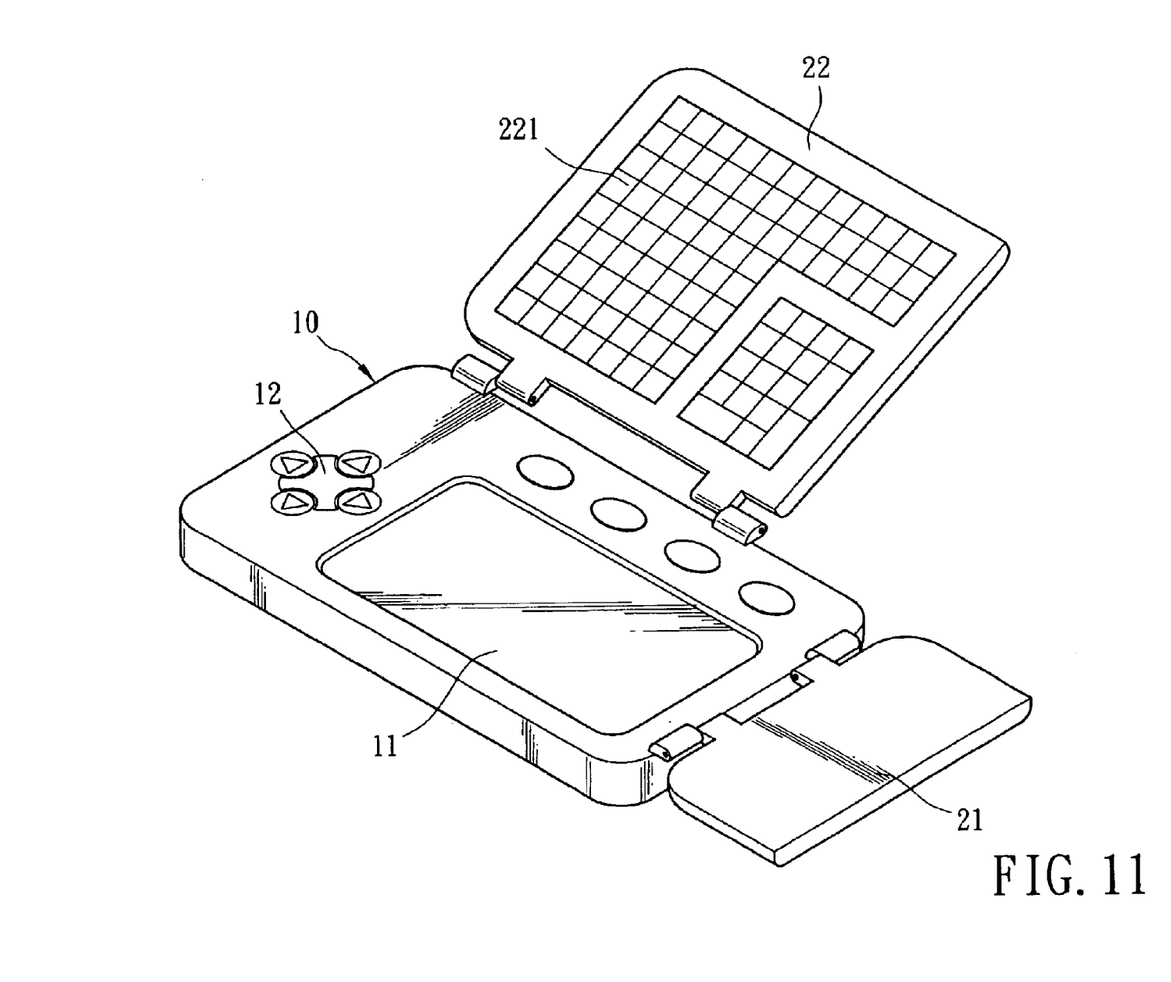
FIG. 11 is a perspective view of a sixth embodiment of the invention in an extended condition.

Refer to FIG. 5 for another embodiment of the invention. It also consists of a main body 10, a first lid 21 and a second lid 22. The main body 10 is for processing data and is formed in a rectangular shape. It, has a usage surface for holding a screen 11 and button keys 12 (such as direction keys and the like). The screen 11 displays data processed by the main body 10, and is laid in such a fashion that the displaying data are parallel to the long axis of the main body 10. The button keys 12 are located on other positions of the main body 10 where the screen 11 is located to enable users to enter input on the main body 10 and correspond to the first lid 21 that is in contact with the main body 10. In addition, the two opposite ends of the main body 10 are pivotally engaged with the first lid 21 and the second lid 22. As shown in FIGS. 6 and 7, the first lid 21 and the second lid 22 may be turned to cover the screen 11 and the button keys 12 (i.e. the usage surface) of the main body 10 to protect the usage surface from being damaged by impact, and to cover a portion of the button keys 12 on the usage surface of the main body 10 to avoid accidental key punching when operating the main body 10.

Referring to FIG. 6, on the other side of the first lid 21 that is not in contact with the usage surface of the main body 10, there is a grip section 13 located on the left lower end (the grip section 13 may attach to a soft pad or a pliable material to make users more comfortable while gripping). The grip section 13 may be a recess rather than jutting out as in previous embodiment. It enables users to grip the device securely when flipping the second lid 22 to view the screen. The embodiment shown in the drawing is mainly for right-handed users to grip the device with the left hand. For left-handed users, the grip section may be located on the right end to facilitate gripping with the right hand.

The surface of the second lid 22 in contact with the main body 10 has a keyboard 221 located thereon to enable users to input data without connecting an external keyboard. This saves users a lot of trouble involved with connecting the external keyboard and makes data entry more convenient for users. The keyboard 221 may be a membrane keyboard or a conventional keyboard.

While the embodiment set forth above has the first lid 21 and the second lid 22 pivotally engaged with the left end and the right end of the main body 10, the first lid 21 and the second lid 22 may also be pivotally engaged with the upper end and the lower end of the main body 10, and with the grip section 13 located on the left end or the right end of the other side that is not in contact with the usage surface to facilitate user gripping. Similarly, when the first lid 21 covers the main body 10, users may still see the data displayed on the screen 11.

Of course, the first lid 21 and the second lid 22 may also be located on two ends that are not opposing each other and still achieve the desired effect, such as on the left end and upper end of the main body 10, on the left end and lower end of the main body 10, on the right end and upper end of the main body 10, or on the right end and lower end of the main body 10.

By means of the construction set forth above, the invention can achieve the following effects:

1. The lids provided by the hand-held electronic device of the invention can be selectively folded to protect the usage surface from being damaged by impact, and cover the button keys on the usage surface of the main body to prevent accidental key punching while operating the main body.
2. The invention provides a grip section to enable users to hold the device securely when in use. The grip section may attach to a soft pad or a pliable material to make users more comfortable while gripping.
3. The button keys on the second lid enable users to enter data conveniently without the need of connecting an external keyboard to the main body, and can save users a lot of inconvenience.
4. The first lid may be turned backwards to serve as a support rack to raise the main body at a selected inclined angle when in use on a flat surface to facilitate user viewing.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A hand-held electronic device, comprising:
   a main body for processing data having a usage surface having a button key; and
   a first lid and a second lid respectively and pivotally engaging with a left end and a right end of the main body, and being turnable to cover the usage surface of the main body to protect the usage surface, the first lid corresponding to the button key located on the usage surface when the first lid is in contact with the main body.

2. The hand-held electronic device of claim 1, wherein the usage surface has a screen.

3. The hand-held electronic device of claim 1, wherein the second lid serves as a support rack for the main body to enable the main body to be rested with an inclined angle.

4. The hand-held electronic device of claim 1, wherein the first lid has a grip section located on another side that is not in contact with the usage surface.

5. The hand-held electronic device of claim 4, wherein the grip section has a soft pad.

6. The hand-held electronic device of claim 4, wherein the grip section is extended from the usage surface.

7. The hand-held electronic device of claim 1, wherein the second lid has a keyboard.

8. The hand-held electronic device of claim 7, wherein the keyboard is a membrane keyboard.

9. The hand-held electronic device of claim 7, wherein the keyboard is a conventional keyboard.

10. The hand-held electronic device of claim 1, wherein the usage surface of the main body has a grip section.

11. The hand-held electronic device of claim 10, wherein the grip section has a soft pad.

12. The hand-held electronic device of claim 10, wherein the grip section is extended from the usage surface.

13. A hand-held electronic device, comprising:
   a main body for processing data having a usage surface having a button key; and
   a first lid and a second lid respectively and pivotally engaging with a left end and an upper end of the main body, and being turnable to cover the usage surface of the main body to protect the usage surface, the first lid corresponding to the button key located on the usage surface when the first lid is in contact with the main body.

14. A hand-held electronic device, comprising:
   a main body for processing data having a usage surface having a button key; and
   a first lid and a second lid respectively and pivotally engaging with a left end and a lower end of the main body, and being turnable to cover the usage surface of the main body to protect the usage surface, the first lid corresponding to the button key located on the usage surface when the first lid is in contact with the main body.

15. A hand-held electronic device, comprising: a main body for processing data having a usage surface having a button key; and
   a first lid and a second lid respectively and pivotally engaging with a right end and an upper end of the main body, and being turnable to cover the usage surface of the main body to protect the usage surface, the first lid corresponding to the button key located on the usage surface when the first lid is in contact with the main body.

16. A hand-held electronic device, comprising:
   a main body for processing data having a usage surface having a button key; and
   a first lid and a second lid respectively and pivotally engaging a right end and a lower end of the main body, and being turnable to cover the usage surface of the main body to protect the usage surface, the first lid corresponding to the button key located on the usage surface when the first lid is in contact with the main body.

* * * * *